(12) United States Patent
Lee et al.

(10) Patent No.: US 6,308,496 B1
(45) Date of Patent: Oct. 30, 2001

(54) COMPUTER MANUFACTURING SYSTEM

(75) Inventors: Yong-Joo Lee, Suwon; Woo-Gun Suk; Byung-Yong Jange, both of Seoul, all of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/302,428

(22) Filed: Apr. 30, 1999

(30) Foreign Application Priority Data

Apr. 30, 1998 (KR) .................................................. 98-15569

(51) Int. Cl.[7] .............................. B65B 35/54; B23P 21/00
(52) U.S. Cl. .................................. 53/154; 53/473; 29/783; 29/771; 29/791; 29/705; 198/345.3; 198/465.1
(58) Field of Search ............................. 53/168, 154, 155, 53/244, 251, 136.3, 390, 508, 437, 54, 473; 29/593, 603.04, 832, 783, 784, 603.03, 430, 737, 771, 786, 791, 793, 794, 705; 198/418.1, 418.2, 418.4, 432, 435, 436, 370.09, 345.3, 465.1, 418.5, 418.6, 427

(56) References Cited

U.S. PATENT DOCUMENTS

| | | | |
|---|---|---|---|
| 2,896,314 | * 7/1959 | Godwin et al. | 29/705 |
| 3,805,974 | * 4/1974 | Andersson et al. | 414/276 |
| 3,929,219 | * 12/1975 | Malcolm | 198/571 |
| 4,473,935 | * 10/1984 | Tasuura et al. | 29/809 |
| 4,475,642 | * 10/1984 | Fritz | 198/345.3 |
| 4,485,911 | * 12/1984 | Cameron | 198/345.3 |
| 4,531,284 | * 7/1985 | Matsuura et al. | 29/784 |
| 4,703,558 | * 11/1987 | Makinen | 29/784 |
| 4,722,653 | * 2/1988 | Williams et al. | 29/563 |
| 4,752,175 | * 6/1988 | Lichti | 198/435 |
| 4,759,123 | * 7/1988 | Ohta et al. | 29/832 |
| 4,783,904 | * 11/1988 | Kimura | 29/783 |
| 4,823,929 | * 4/1989 | Fleming et al. | 198/345 |
| 5,272,805 | * 12/1993 | Akeel et al. | 29/791 |
| 5,284,003 | * 2/1994 | Goodman et al. | 53/437 |
| 5,353,495 | * 10/1994 | Terabayashi et al. | 29/783 |
| 5,386,621 | * 2/1995 | Fluegge et al. | 29/705 |
| 5,873,449 | * 2/1999 | Davenport | 198/370.09 |
| 5,893,208 | * 4/1999 | Sasaki et al. | 29/430 |
| 5,970,749 | * 10/1999 | Bloom | 65/378 |
| 6,035,517 | * 3/2000 | Moore et al. | 29/593 |
| 6,067,699 | * 5/2000 | Jackson | 29/430 |
| 6,105,244 | * 8/2000 | Lin et al. | 29/832 |

* cited by examiner

*Primary Examiner*—S. Thomas Hughes
*Assistant Examiner*—Marc Jimenez
(74) *Attorney, Agent, or Firm*—Robert E. Bushnell, Esq.

(57) ABSTRACT

The computer manufacturing system includes an assembly unit wherein various assembly parts are assembled into a main chassis according to a process order to complete the assembly of a computer body, an aging and test unit for testing and checking the performance of the computer body transferred from the assembly unit, and a package unit for packaging the computer body transferred from the aging and test unit. The assembly unit, the aging and test unit, and the package unit are sequentially aligned in accordance with process sequences. The assembly unit and the package unit are aligned to the opposite facing each other while the aging and test unit is located between the assembly unit and the package unit.

37 Claims, 11 Drawing Sheets

COMPUTER MANUFACTURING SYSTEM

CLAIM OF PRIORITY

This application makes reference to, incorporates the same herein, and claims all benefits accruing under 35 U.S.C. §119 from an application for Computer Manufacturing System earlier filed in the Korean Industrial Property Office on Apr. 30, 1998 and there duly assigned Serial No. 98-15569.

BACKGROUND OF THE INVENTION

1. Field of the Invention

The present invention relates to a computer manufacturing system, and more particularly, to a computer manufacturing system to improve its flexibility for small amount of production for various types of items by changing the production line for assembling, aging, testing, and packaging computer bodies into unit cell structure.

Related Art

Production lines including, testing and packaging have been used for production of computers. Typically, most production lines for assembling, aging, testing and packaging are designed and arranged for mass production of a product such as computer. Computers used in almost all industrial fields are becoming more and more diversified. To comply with the recent demands, the computer production lines have to be changed to increase value-added productivity with the production conception compatible with multi-itemized production in small amounts.

A personal computer is made by assembling a monitor, a body, and various auxiliary equipments into one set, and in the computer body, various disk drives, boards, or power suppliers, etc. are assembled by option. The various disk drives assembled in the computer body may include a hard disk drive, a floppy disk drive, or a compact disk. The various boards may include a main board, a video board, or a sound board, etc.

The conventional computer manufacturing system is a mass production system for a specific model. Processes are specialized and divided. A large number of personnel are displaced on each diversified process. A manufacturing system for the mass production for one single item requires large investment.

However, recently, the environment for computer business markets has been changed because of various computer items and shortened life time of each item, etc. Therefore, the conventional mass production system established by large investment cannot be effectively adapted to the rapidly-changing market environment, and the productivity and efficiency are deteriorated in spite of the investment.

Also, the conventional mass production system cannot be appropriately applied for small amount production per model of multiple items. Also, it is difficult to keep balance of the outputs for each unit process. A partial operation stop often occurs thereby causing lots of time for the whole production processes for one item.

In addition, the conventional mass production system needs scores of operators for the diversified processes, and the sufficient quality verification is difficult to guarantee because of maintenance of a separate test process, and operators cannot take an action quickly and promptly on operations because they work seated on the chairs.

SUMMARY OF THE INVENTION

The present invention is directed to provide a cell line structure for allowing small amount of production for a specific item.

Another object of the present invention is to establish the conformity to the multiple items production by employing plurality of cell lines and overcoming the limit of the life time per model.

A further object of the present invention is to make manufacturing lines for computer body into cell line of system ways, and allow easy replacement of the apparatuses installed in the cell lines.

A still further object of the present invention is to increase the operation efficiency by making operators commonly or assistantly perform the jobs in other areas, and do the jobs standing.

A still another object of the present invention is to easily keep balances for outputs from respective unit process, and prevent the stop of the production flows thereby reducing the production time in outputting products.

A still another object of the present invention is to make quality assurance for products possible by performing test in unit cell line.

To achieve these and other advantages and in accordance with the purpose of the present invention as embodied and broadly described, the computer manufacturing system comprise an assembly unit wherein various assembly parts are assembled into a main chassis according to a process order to complete the assembly of a computer body, an aging and test unit for testing and checking the performance of the computer body transferred from the assembly unit, and a package unit for packaging the computer body transferred from the aging and test unit, the assembly unit, the aging and test unit, and the package unit sequentially aligned in accordance with process sequences, and the assembly unit and the package unit being aligned to the opposite facing each other.

The work place for the assembly unit and the work place for the package unit are preferably shared.

In addition, the assembly unit may comprise a preassembly unit in which brackets are assembled with the assembly parts including various disk drives, and a main assembly unit in which the assembly parts transferred from the preassembly unit and other parts are assembled into the main chassis, and a cover is put into the main chassis to complete the assembly of the computer body, the main assembly unit being preferably connected with the preassembly unit with sequentially aligned.

A car may be further provided on the main assembly unit to move the main chassis from a certain location thereto, the car being displaced in a certain space between the preassembly unit and the main assembly unit.

The preassembly unit may comprise a first work section for performing a preassembly job, and a receipt section contacted with the first work section to supply parts to be preassembled. Also, a hard disk copy may be displaced on one side of the first work section to copy hard disk drives to be preassembled. in addition, a carrier including a transfer box may be provided on one side of the first work section, and the carrier reciprocally moves between the preassembly unit and the main assembly unit.

In addition, the receipt section may be constructed as a upper layer and a lower layer, wherein parts to be assembled are supplied via the upper layer with contained inside a box, and an empty box is collected from the other layer, a lower layer, either one of the above two layers, the upper layer and the lower layer, being slanted toward the first work section, the other layer being slanted toward its opposite side.

The main assembly unit may comprise a second work section in which a main assembly job is performed, and a second receipt section to supply parts to be assembled, a transfer means being installed on the upper side of the second work section to transfer a main sushi, and also, a supplementary plate having a plurality of ball bearings provided thereon may be assistantly used.

The aging and test unit may comprise at least one aging car to load plurality of computers assembled in the assembly units, and aging is performed by a predetermined test program in the aging car.

The aging car performs the aging, and moves into one direction by a guide rail provided thereon. While the aging car moves into one direction along with the guide rail, the aging and test unit further comprises a first moving means for automatically moving the computer body assembly-completed in the assembly units to the aging and test unit, and preferably, a test section having at least one monitor displaced with a certain height for checking the aging result for the aging-completed computer body.

The aging and test unit may further comprises a buffer car for temporarily storing the test-completed computer bodies, and a second moving means for moving the computer body loaded in the buffer car for package. The second moving means comprises a second transfer frame to move up/down within frames to move the computer body in the buffer car for package.

The package unit may comprise at least one vacuum absorber, a driving means for driving the vacuum absorber, and a table displaced under the vacuum absorber and performing the package for the computer body, the computer body lifted by the vacuum absorber and packaged with a package box under the computer body.

Further objects, features and advantages of the present invention will become apparent from the following detailed description of a preferred embodiment thereof made with reference to the accompanying drawings.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The computer manufacturing system is constructed in a manner that a plurality of unit cells are divided inside a factory, each cell having a certain space area and producing computer bodies of an identical item or different items.

The cell includes various units to assemble computer bodies and to perform the test and package, and is divided into a work space for a number of operators and a displacement space for various units.

In the work space, a number of operators are displaced according to the processes and only perform their own jobs or share the operation. The displacement space for units is constructed such that the units to perform the operation can be aligned to the opposite side of the units or adjacent the unit.

Figure 1:
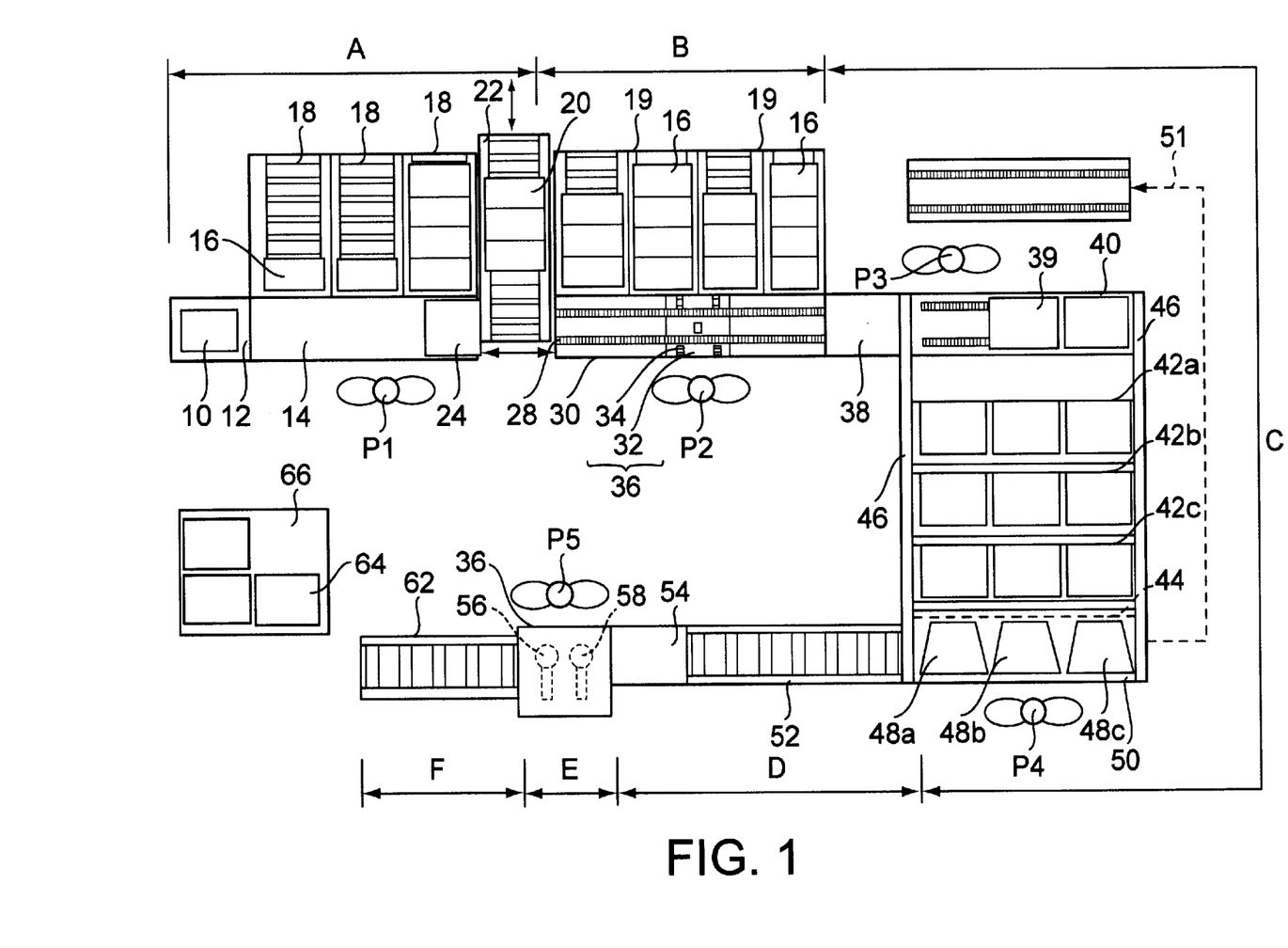
FIG. 1 is a layout design to show one preferred embodiment of the computer manufacturing system according to the present invention.

Referring to FIG. 1, the displacement space has a double-bended structure, wherein some units are displaced bended, and some units are aligned facing each other. The displacement space for the units may be divided into multiple areas. The displacement space can be roughly divided into a preassembly area A, a main assembly area B, an aging and test area C, a buffer and carrier area D, a package area E, and an output area F.

The preassembly area A and the main assembly area B for assembly are connected for the continuity of the process while the buffer and carrier area D, the package area E, and the output area F are displaced to the opposite sides of both the preassembly area A and the main assembly area B. The main assembly area B and the buffer and carrier area D facing in parallel are connected by the aging and test area C.

Figure 2:
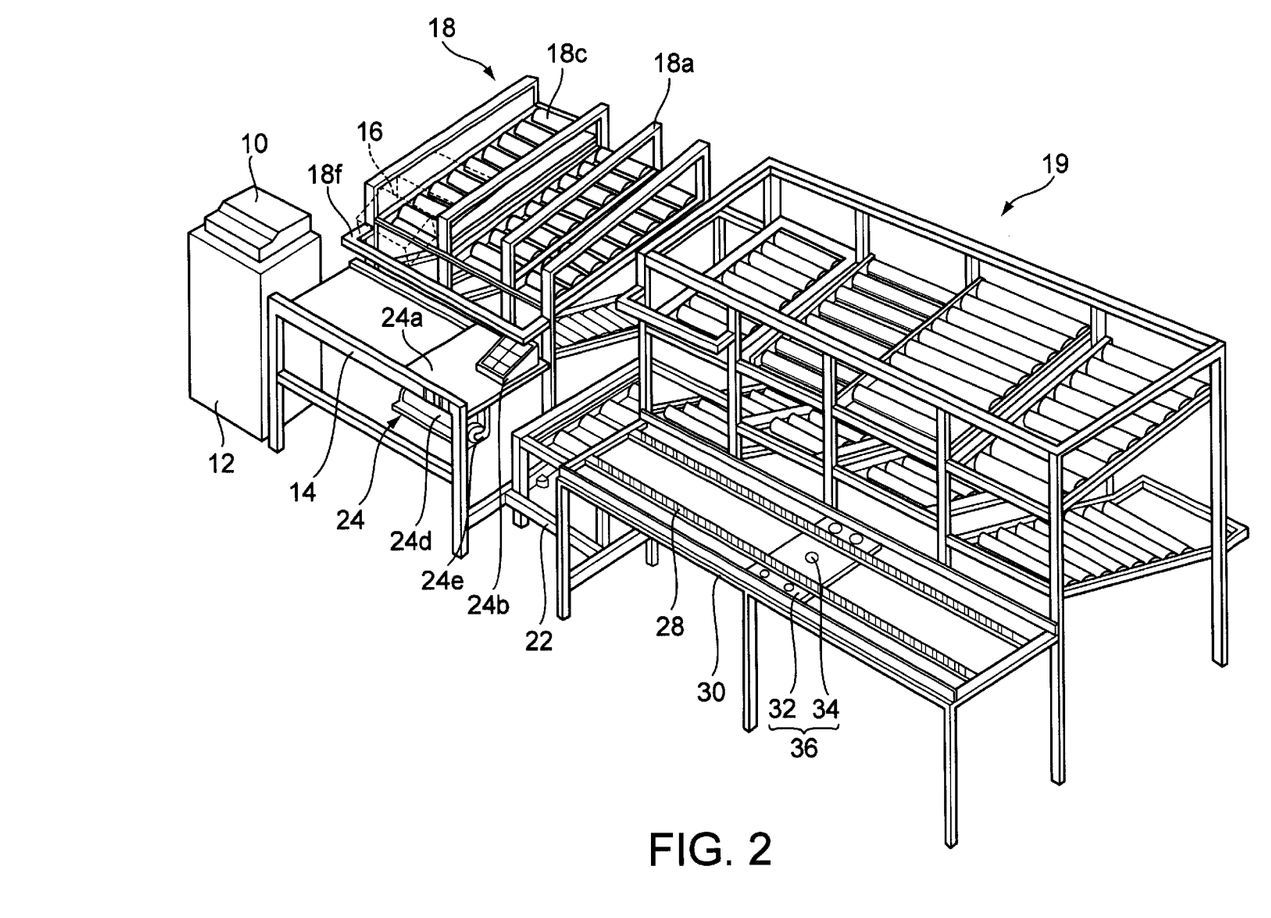
FIG. 2 is a perspective view to show the units of a preassembly area and a main assembly area of FIG. 1.
Figure 5:
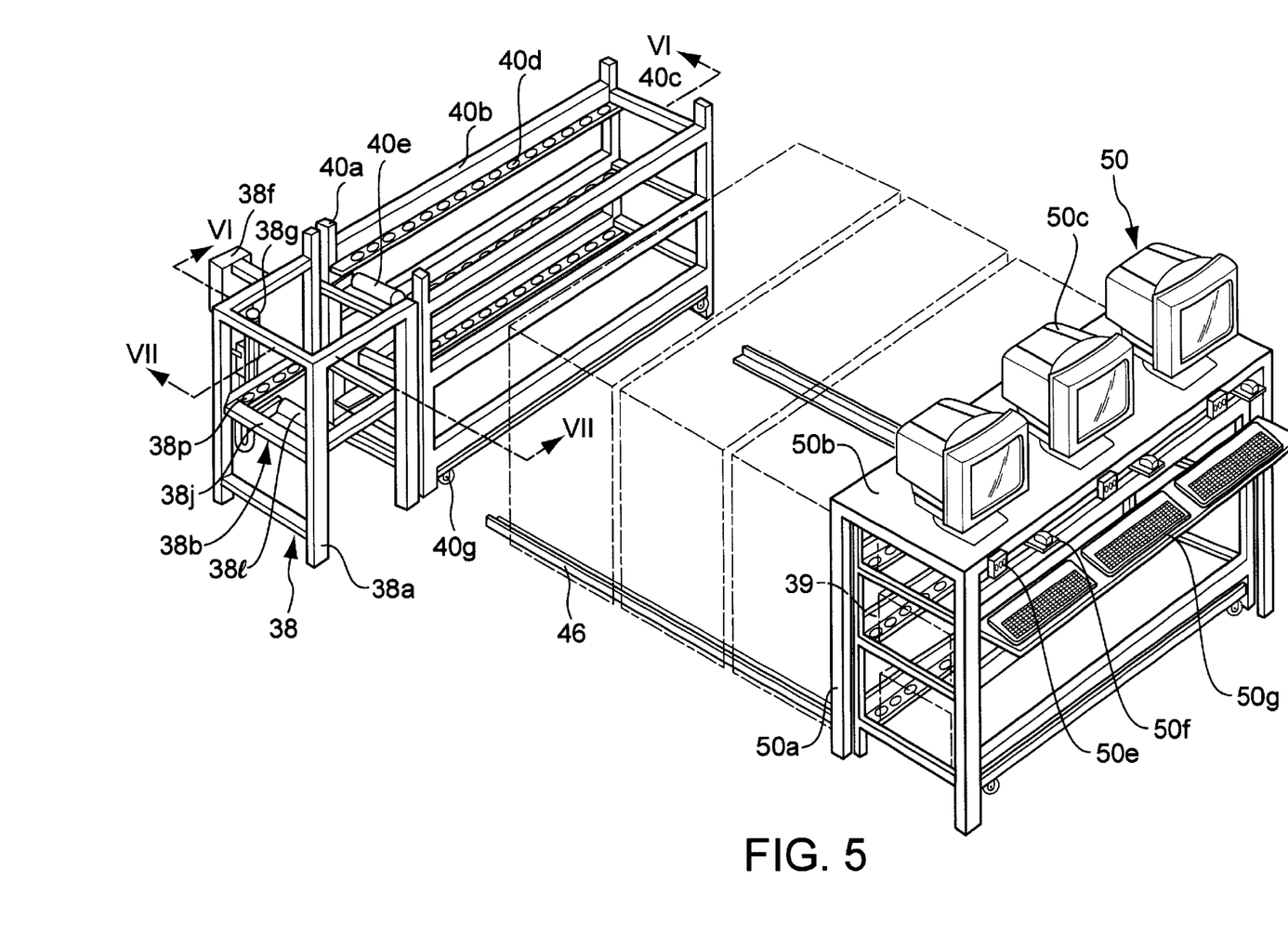
FIG. 5 is a perspective view to show the units of the aging and test area of FIG. 1.
Figure 9:
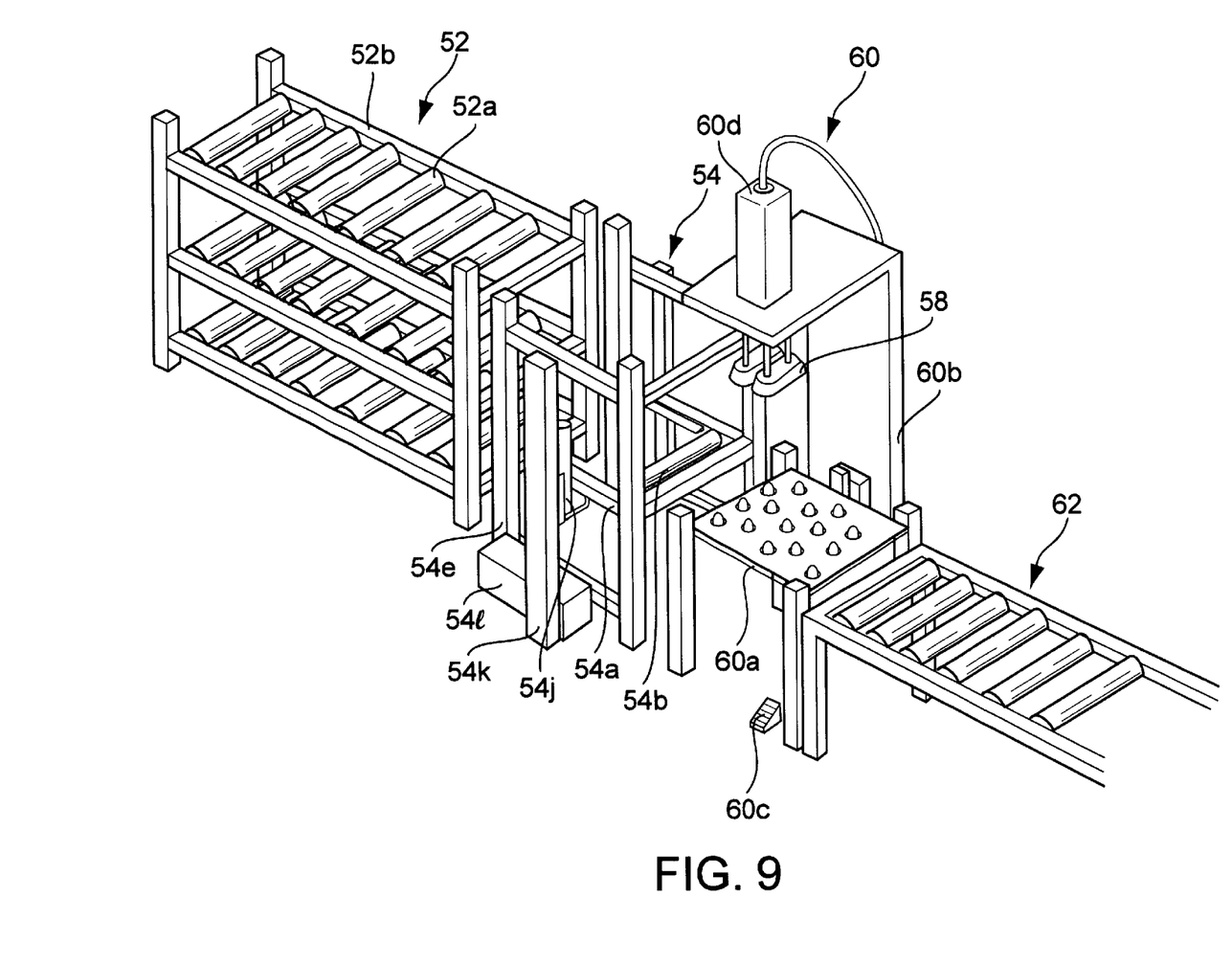
FIG. 9 is a perspective view after the buffer and carrier area.

The preassembly area A, as shown in FIG. 2, comprises a plurality of equipment as preassembly units such as a hard disk copy, a receipt section, a delivery car, and a preassembly work section. The main assembly area B is constructed with main assembly units such as a porter, a main work section, etc. Also, the aging and test area C, as shown in FIGS. 1 and 5, comprises a plurality of equipment as aging and test units, i.e. a moving container, an aging car, a test section, etc. The buffer area D as buffer units, including a buffer car and a moving container to store and move the computer bodies are installed as shown in FIGS. 1 and 9. A package as package unit is installed in the package area E as shown in FIGS. 1 and 9, and the output area F comprises a plurality of equipment as output units, i.e. a transfer section including conveyor line, and a pallet, etc. as shown in FIGS. 1 and 9.

Referring to FIGS. 1 and 2, in a preassembly area A, a hard disk copy 10 for formatting a hard disk drive(not shown) and copying the programs for the test and operation is displaced on the upper side of a copy work section 12 having a certain height. On one side of the copy work section 12 is a preassembly work section 14 located, wherein various disk drives including a hard disk drive, a floppy disk drive(not shown), and a compact disk drive(not shown) are screw-coupled with their respective brackets(not shown) to produce modules. A first operator P1 is located on one side of the preassembly work section 14, and he copies a hard disk drive and performs a bracket-coupling job of the various disk drives.

The preassembly work section 14 is constructed such that the height of the work place is proper enough for the operator P1 to efficiently work(for example, waist height). A preassembly receipt section 18 supplies various parts such as brackets, various disk drives, and screws, etc. Empty boxes 16 are taken away. There is provided a preassembly carrier 24 for loading and transferring modules such as the bracket-coupling completed various disk drives to a main work section 30 for main assembly.

Figure 3:
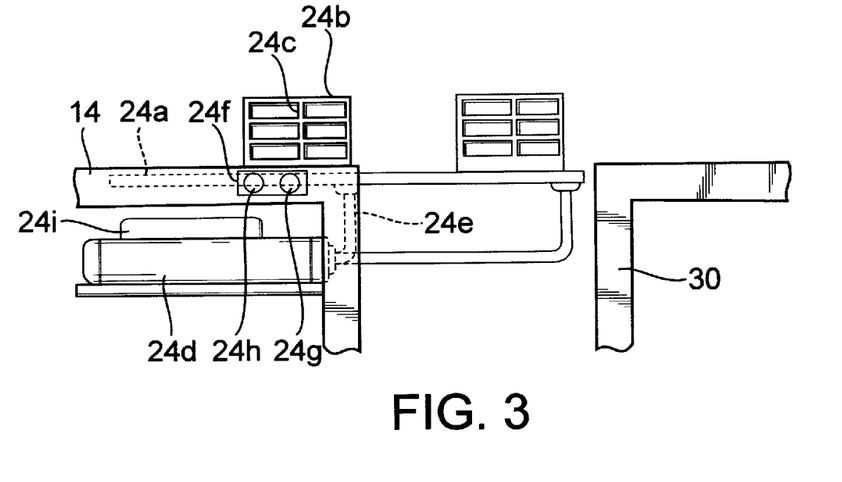
FIG. 3 is a front view to partially show the carrier of the preassembly area.

FIG. 3 shows the structure of the carrier 24 in detail. A sliding plate 24a as a preassembly carrier 24 is provided on the upper side of the preassembly work section 14, and a carrier box 24b is provided on its upper side.

The carrier box 24b has a multi-layer structure. A number of spaces for the carrier box 24b may be provided in one layer with divided by a partition 24c. The sliding plate 24a is coupled with one end of a moving shaft 24e vertically-bending extended from a cylinder 24d placed under the preassembly work section 14, and the cylinder 24d is driven by the driving force applied from a cylinder driving part 24i. A switching assembly 24f for electrically converting the driving state of the cylinder 24d located on one side of the preassembly work section 14. The switching assembly 24f comprises a forward switch 24g and a backward switch 24h and is connected to the cylinder 24d.

Described as above, the preassembly carrier 24 is interlocked with the driving of the cylinder 24d and reciprocally moves between the preassembly work section 14 and the main work section 30, and the moving direction of the preassembly carrier 24 is determined by the selection of either the forward switch 24g or the backward switch 24h by the first operator P1.

Figure 4:
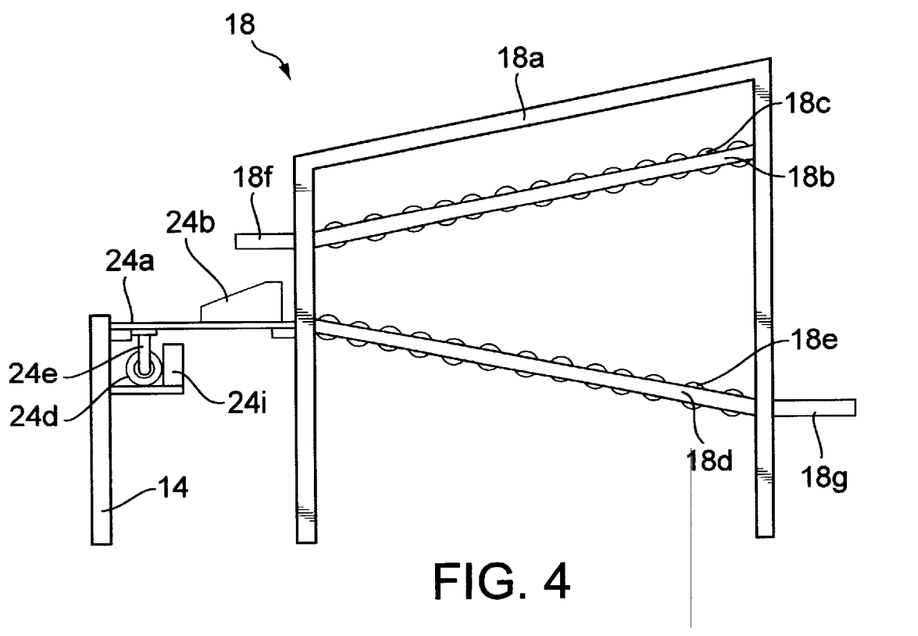
FIG. 4 is a side view to show the work section and the receipt section of the preassembly area

Meanwhile, the preassembly receipt section 18 for supplying various disk drives for bracket parts, etc., as shown in FIG. 4, has a double layer structure within a preassembly frame 18a connected to the preassembly work section 14. The upper layer of the preassembly receipt section 18 comprises a preassembly frame 18b which is slanted downward toward the preassembly work section 14 and a plurality of preassembly rollers 18c which are provided on the preassembly frame 18b. The lower layer of the preassembly receipt section 18 displaced under the above preassembly frame 18b with a certain distance away therefrom, comprises a preassembly frame 18d which is slanted downward remote from the preassembly work section 14 and a plurality of preassembly rollers 18e which are provided on the preassembly frame 18d. In addition, a preassembly frame 18f is provided on the one end of the preassembly frame 18b as the upper layer toward the preassembly work section 14 so that a sliding box 16 can be caught thereto. Also, a frame 18g is provided on the one end of the preassembly frame 18d as the lower layer remote from the preassembly work section 14 so that a sliding box 16 can be caught thereto.

Boxes 16 can slide along the preassembly rollers 18c, 18e provided on the upper layer and the lower layer moving toward declining direction. The above preassembly receipt section 18 is constructed such that at least two or three of the preassembly receipt sections are parallel-aligned to the preassembly work section 14 in order to supply the various disks or the parts separately.

Also, a main work section 30 and a main receipt section 19 are installed symmetrically with the preassembly work section 14 and the receipt section 18 of the preassembly section A, and between the receipt sections 18, 19, there is displaced a delivery car 22 to load and supply a main chassis 20. The delivery car 22 is capable of moving with wheels (not shown) on its bottom, and moves the main chassis 20 from a specific location to the place between the receipt sections 18, 19 of the preassembly area A and the main assembly area B.

A second operator P2 in the main assembly area B performs an assembly and a connection job for various disk drives which are bracket-coupled in the preassembly area A, various boards, the power supplier, and inner parts.

The main work section 30 of the main assembly area B has the same height as the height of the work section of the preassembly area A, and the upper surface of the main work section 30 has a conveyor line 28 provided throughout the whole surface to horizontally move the main chassis 20 transferred from the delivery car 22 thereon.

A supplementary work plate 36 is displaced on where the above assembly and the connection jobs take place, a ball bearing 34 being provided on its upper surface.

A plurality of ball bearings 34 are dispersedly provided on the top of a wood-made plane plate 32 of the supplementary work plate 36, and the plane plate 32 is displaced under the conveyor line 28. The ball bearing 34 is protruded a little higher than the height that the conveyor line 28 supports the main chassis 20 thereover. By the ball bearing 34 of the supplementary work plate 36, the main chassis 20 can be rotated freely into necessary directions for an assembly job.

The main receipt section 19 having the same structure as the receipt section 18 of the preassembly area A is parallel aligned with the main work section 30 of the main assembly area B to supply a main board, a video board, a power supplier, or the parts for a connection job separately as shown in FIG. 4.

In the preassembly area A and the main assembly area B in which units for the assembly of computer bodies are arranged as described above, the first operator P1 and the second operator P2 perform the assembly jobs for computer bodies. The first operator P1 formats hard disk drives in the hard disk copy 10 and copies the programs necessary for the operation and test. Also, the first operator P1 moves modules such as copy-completed hard disk drives and floppy disk drives or compact disk drives which are supplied via the receipt section 18 to the preassembly work section 14, performs bracket-coupling, and puts modules of the various bracket-coupled disk drives into the carrier box 24b of the preassembly carrier 24.

The preassembly carrier 24 containing a number of various bracket-coupled disk drives is driven by the switch assembly 24f controlled by the first operator P1 The bracket-coupled disk drives in the preassembly carrier 24 can be moved to the main work section 30 of the main assembly area B by the selection of the forward switch 24g by the first operator P1. On the contrary, if the preassembly carrier 24 is found located in the main work section 30 of the main assembly area B when putting the bracket-coupled disk drives into the carrier box 24b, the first operator P1 pushes the backward switch 24h of the switch assembly 24f so as to move the preassembly carrier 24 back to the preassembly work section 14 of the preassembly area A.

Then, the second operator P2 moves the main chassis 20 loaded on the car 22 to the conveyor line 28 to be placed on the supplementary work plate 36, and assembles a final product by using the various disk drives inside the preassembly carrier 24 and the main chassis 20. The second operator P2 puts the various boards including main boards or video boards and the power suppliers which are supplied from the upper side of the main receipt section 19 into the main chassis 20. Then, various wires for the power supply are put into the main chassis 20, and various boards or power supplier, various disk drives are connected by the above wires.

If the parts setting and the parts connecting inside the main chassis 20 are completed, the second operator P2 puts together the main chassis 20 with a case (not shown)

supplied via the upper side of the main receipt section 19 contacted with the main work section 30. Then, the assembly-completed computer body 39 as a final product is taken from the supplementary work plate 36 and moved to an aging and test area C.

The assembly-completed computer body 39 is tested for the establishment and the maintenance of the quality assurance prior to the output. For this end, the aging and test area C is connected to the place where the computer body 39 from the main assembly area B is transferred, which will be described referring to FIGS. 1 and 5.

The aging and test area C may be divided into sections: a moving container 38 to move assembly-completed computer body from the main work section 30 of the main assembly area B to an aging car 40 for aging, the aging section to test the performance while the aging car 40 is moving for a certain time, and the test section to test the aging results for the aging-completed computer body 39.

The moving container 38 is displaced between the main work section 30 of the main assembly area B and one single aging car 40 to be newly-input into the aging section.

Figure 6:
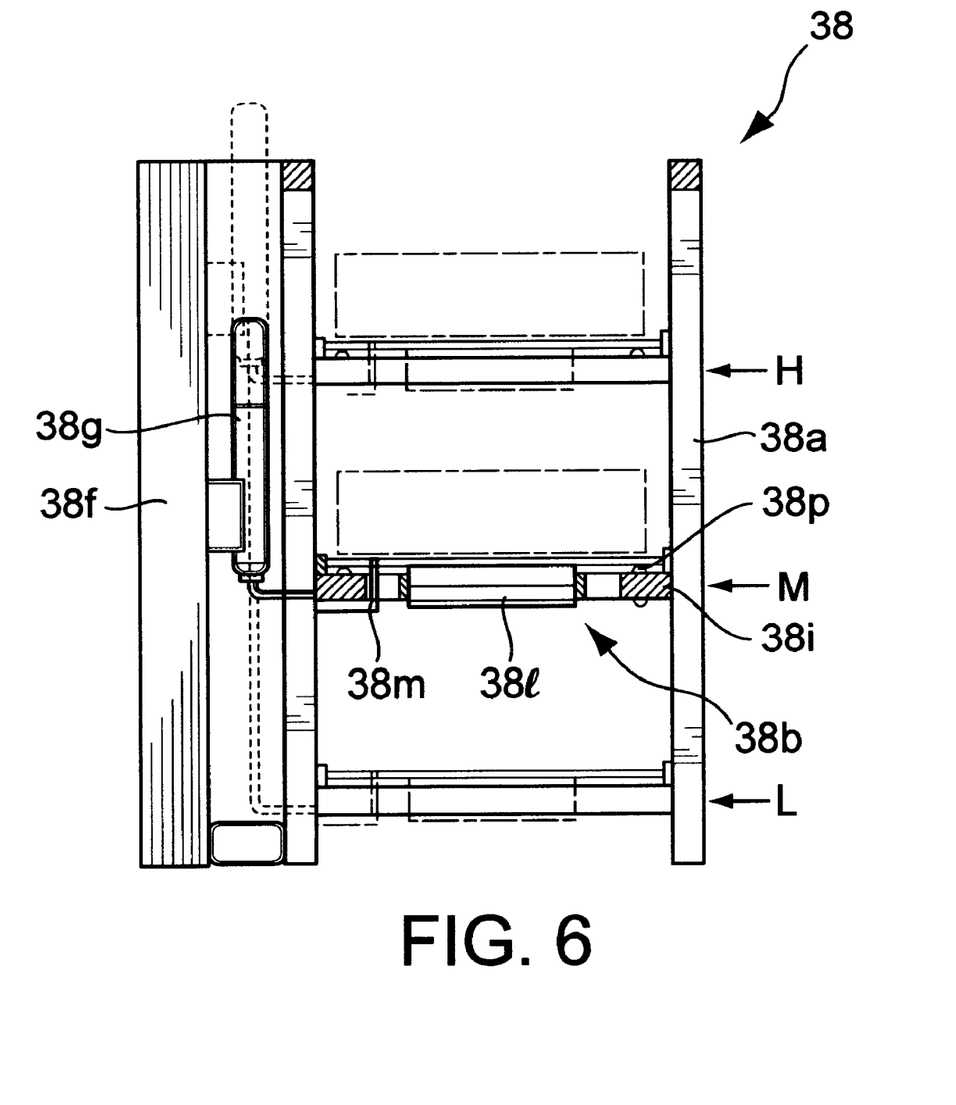
FIG. 6 is a VI—VI sectional view of the FIG. 5.
Figure 7:
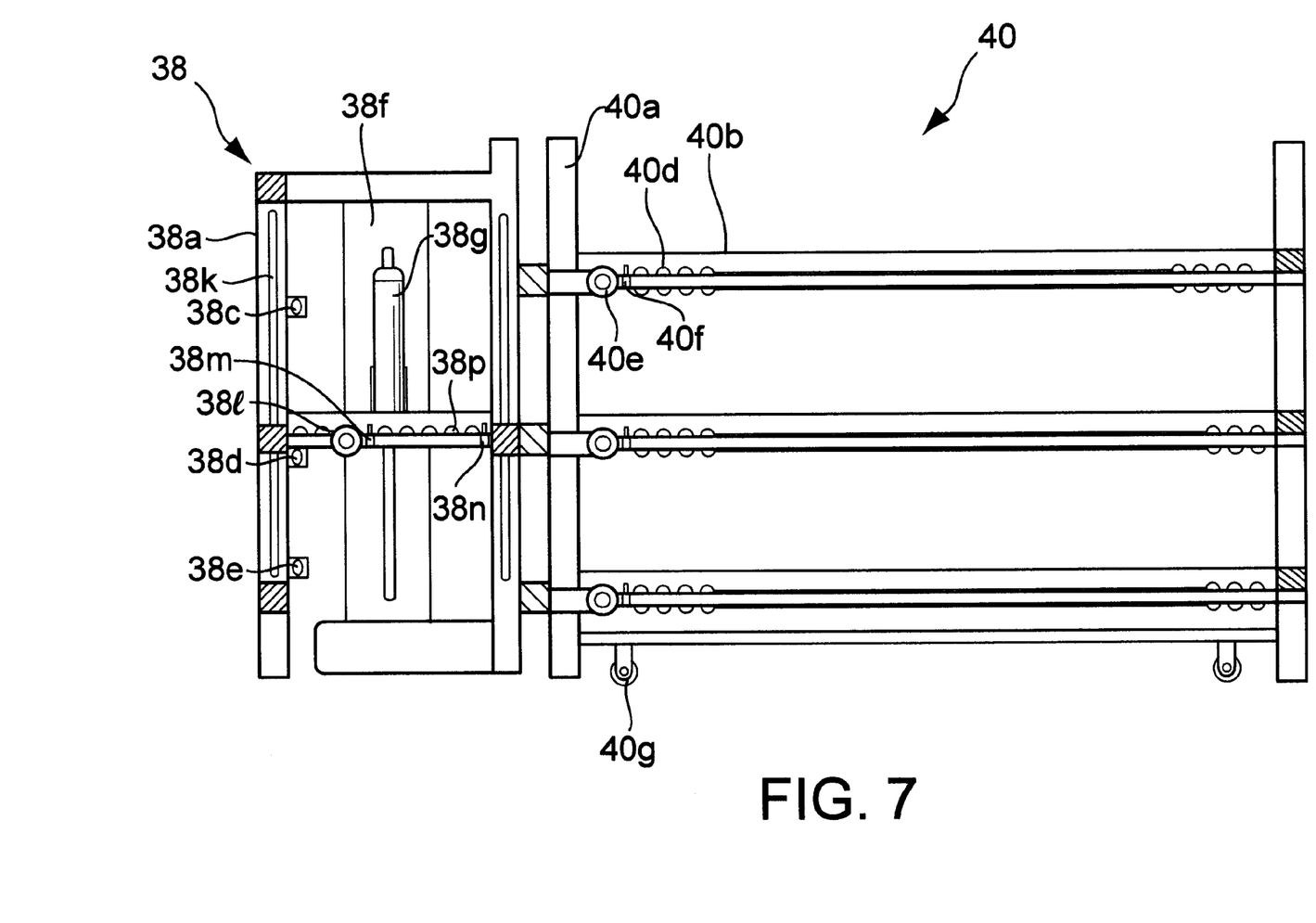
FIG. 7 is a VII—VII sectional view of the FIG. 5.

The detailed-shape of the moving container 38 is shown in FIG. 6 as a sectional view taken along the line VI—VI of FIG. 5, and in FIG. 7 as a sectional view taken along the line VII—VII of FIG. 5.

The moving container 38 is supported by rectangular-jointed frames including a container frame 38a vertical-shaped on each edge and a transfer frame 38b moves up/down loading the computer body 39. Sensor assembly 38c, 38d, 38e are installed on one frame 38a vertical-shaped on a specific edge in order to sense the locations of the transfer frame 38b in any one of upper layer. The moving container 38 comprises a first and a second container cylinders 38f, 38g to transfer the transfer frame 38b, and a driving part 38h is fixed installed on one part of the rectangular-shaped frame.

The first container cylinder 38f moves up/down the second container cylinder 38g, and the second container cylinder 38f moves up/down the transfer frame 38b.

If the second container cylinder 38g changes the location of the transfer frame 38b up/down with the second container cylinder 38g fixed on the upper side by the first container cylinder 38f, the transfer frame 38b reciprocates between the upper layer and middle layer. If the second container cylinder 38g changes the location of the transfer frame 38b up/down with the second container cylinder 38g fixed on the lower side by the first container cylinder 38f, the transfer frame 38b reciprocates between the middle layer and the lower layer. The transfer frame 38b moving between the upper layer, the middle layer, and the lower layer comprises a side-support frame 38i and a horizontal frame 38j which are all connected with rectangular shapes. A number of rollers 38p are provided on the side-support frame 38i aligned in a line, and supports the one direction movement of the computer body 39, and the lengthwise direction end of each horizontal frame 38j is jointed with the side of its contacting frame 38a.

A guide hole 38k is provided on the side of the frame 38a, and the end of the horizontal frame 38j is inserted into the guide hole 38k so as to support the up/down movement.

In addition, a driving roller 38l is provided where the computer body 39 is introduced to the horizontal frame 38j of the transfer frame 38b and a first sensor assembly 38m is provided on one side of the support frame 38i having the driving roller 38l to sense whether the computer body 39 is introduced. A second sensor assembly 38n is provided on the support frame 38i where the end of the computer body 39 is located after the computer body 39 is completely taken in to sense the complete loading of the computer body 39.

The aging car 40 which is longitudinally jointed with the moving container 38 has a structure of upper layer, middle layer, and lower layer which have rectangular shapes by the horizontal frame 40b and the support frame 40c which are plane-jointed with the vertical frame 40a respectively. An array of rollers 40d is provided adjacently inside each of the horizontal frame 40b to support one direction movement of the computer body 39. A driving roller 40e is installed on the horizontal frame 40b to one-directionally rotate with driving force applied from a certain motor (not shown). A sensing assembly 40f is installed on the support frame 40c adjacent to the driving roller 40e to sense the input presence of the computer body 39 and to decide the driving state of the driving roller 40e. In addition, wheels 40g are installed on the bottom of the support frame 40c, each on the four edges of the aging car 40 respectively.

As described above, by connecting the moving container 38 and the aging car 40, the computer body 39, which is assembly-completed in the main assembly area B, passes through the moving container 38 and is loaded into the aging car 40.

In detail, after assembling if the second operator P2 in the main assembly area B pushes the computer body 39 toward the moving container 38 using the conveyor line 28 of the main work section 30, the computer body 39 is input to the transfer frame 38b and touches the sensor assembly 38m so that the switching state of the sensor assembly 38 is converted and the driving roller 38l starts to move. The sensor assembly 38 and the driving roller 38l are connected to a monitor (not shown).

The driving roller 38l is contacted with the bottom of the computer body 39 and moves the computer body 39 into the transfer frame 38b. The computer body 39 slides by the roller 38p installed on the support frame 38i and is input to the moving container 38. If the computer body 39 is completely taken inside the transfer frame 38b, the sensor assembly 38n of the transfer frame touches the end of the computer body 39, and the operation of the driving roller 38l stops if the switching state of the sensor assembly 38n is converted.

With the input completed as described above, the transfer frame 38b in the middle location (M) is moved to the upper location (H) or the lower location (L) by the operation of the first cylinder and the second cylinder. The moving location of the transfer frame 38b which is moved by both the first cylinder and the second cylinder is determined by the sensor assembly 38c, 38d, 38e installed on the upper location (H), the middle location (M), and the lower location (L). Depending on the switching state of the sensor assembly 38c, 38d, 38e, the driving roller 38l pushes the computer body 39 toward the aging car 40.

For example, with the transfer frame 38b moved to the upper location (H), if the computer body 39 is pushed by the driving roller 38l toward the aging car 40, the computer body 39 is taken into the aging car 40. If the computer body 39 is input to a certain location, the sensor assembly 40f of the aging car 40 touches the computer body 39, and the switching state is converted.

Then, the driving roller 40e of the aging car 40 starts to move, drags the computer body 39, and loads into the aging car 40. If the computer body 39 continuously proceeds, and passes through the sensor assembly 40f, the switching state is converted, and the driving of the driving roller 40e stops.

While the above operation is repeatedly carried out, the computer body 39 is loaded into the aging car 40 by the moving container 38.

Meanwhile, a third operator (P3) performs the connection job of the aging car 40 and the moving container 38 and connects a new aging car 40 into the moving container 38, and then the loaded computer body 39 is set for aging. The third operator P3 inserts a disk having a certain program for aging the computer body 39 loaded in the aging car 40 and turns on the computer body 39 with applied power. In addition, the third operator P3 connects a mouse (not shown) for testing the aging results to be described into the computer body 39.

In addition, with setting for aging the computer bodies 39 loaded each layer of the aging car 40 completed, the third operator P3 releases the connection with the moving container 38 and pushes the setting-completed aging car 40 into one direction. After the third operator P3 inputs a new aging car the third operator P3 connects the new aging car with the moving container 38 to prepare to load an another computer body 39.

Meanwhile, in the aging section as one part of the aging and test area C, a newly-input aging car 40 and aging cars 42*a*, 42*b*, 42*c* are parallel aligned, the aging cars 42*a*, 42*b*, and 42*c* performing aging for a number of loaded computer bodies 39. In the section for testing the aging results, the aging car 44 performing to test the aging results for the aging-completed computer body 39 is in-line aligned parallel with the above aging cars. The above aging cars 40, 42*a*, 42*b*, 42*c*, and 44 are aligned in line parallel by the guide rail 46 on their bottoms, and are sequentially moved to one direction. While the computer bodies 39 loaded on respective aging cars 40,42*a*,42*b*, and 42*c* move to one direction, the aging is completed.

While the aging cars 40, 42*a*, 42*b*, and 42*c* are moved, any abnormality is checked. A test section 50 is provided on the moving end of the aging cars 42*a*, 42*b*, and 42*c*. A fourth operator P4 is displaced on the test section 50, and he checks the aging results for the computer body 39 loaded on the aging car 44.

The test section 50 has a upper plate 50*b* supported by vertical frame 50*a* on the both sides, and on the lower side of the upper plate 50*b*, the aging car 44 is displaced, aging-completed computer bodies 39 loaded on each layer.

Figure 8:
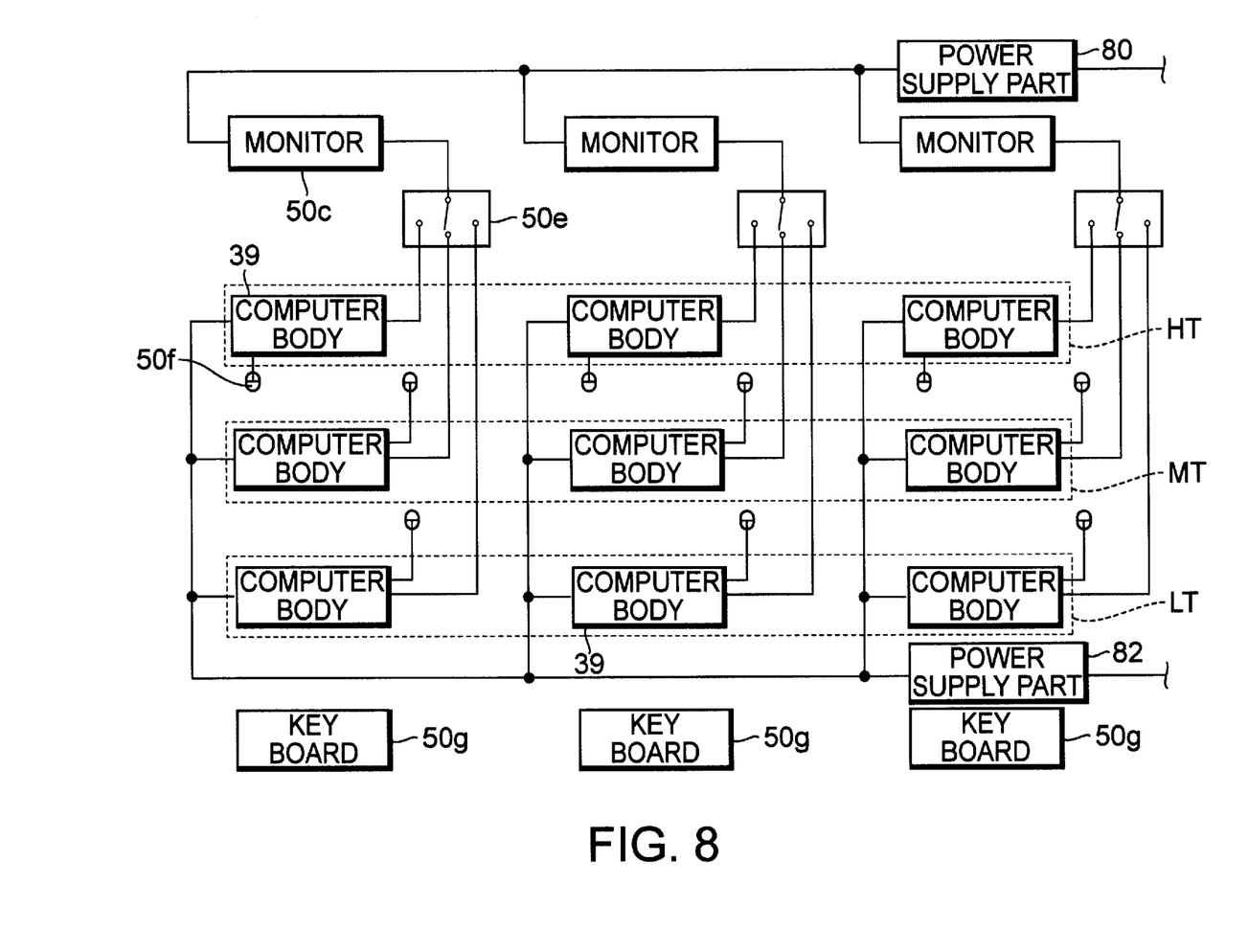
FIG. 8 is a block diagram to show the test section.

In addition, motors 50*c* for checking the aging results by image display is provided on the upper plate 50*b*, the number of the monitors 50*c* being identical to the number of the computer bodies 39 input in each layer. The monitors 50*c* can be selectively connected with the computer bodies 39 loaded on the aging car 44 thereunder via the switching assembly 50*e* installed on the upper plate 50*b*. The block diagram for this is shown in FIG. 8.

A specific monitor 50*c* is connected with the computer body 39 loaded in the same row in the upper layer (HT), the middle layer (MT), or the lower layer (LT) of the aging car 44 via the switching assembly 50*e*. The switching assembly 50*e* selectively connects any one of the computer bodies 39 located in the same rows in each layer by the fourth operator (P4). Mouse 50*f* connected during the setting before aging is connected to each computer body 39 with one-to-one correspondence. Also, the switching assembly 50*e* is installed on each monitor 50*c* displaced on the upper side of the upper plate 50*b* of the test section 50 with one-to-one correspondence. A power supply part 82 is set to apply power to each monitor 50*c*, and power from a power supply part 82 is applied to each computer body 39.

A fourth operator P4 checks the aging results by the control of the mouse 50*f* of the computer body 39. If necessary, an ear phone (not shown) is connected to a corresponding port of the computer body 39 so as to check the output state of sound. The test for a specific result can be selected by using a key board 50*g*. The fourth operator P4 tests the aging results according to a sequence from the left computer body 39 to the right one. By controlling each switching assembly 50*e*, the computer body 39 in the middle layer (MT) and the lower layer (LT) can be sequentially tested.

Information for the computer body 39 is displayed on the monitor 50*c* by selective connecting the switching assembly 50*e*. With the test for the whole computer bodies 39 loaded on the aging car 44 completed by the above sequence, the fourth operator P4 releases the connection state of each of the computer bodies 39.

The fourth operator P4 moves the computer body 39 to a buffer area D. At this time, the transfer of the computer body 39 is made by using rollers displaced on rows in each layer of the aging car 44. An empty aging car is taken away from a guide rail 46 by the fourth operator P4, and the third operator P3 moves the empty aging car to the direction of the dotted line 51 and newly-inputs.

Units for the transfer and the package of the computer bodies 39 after the buffer area D will be described with reference to FIG. 1, and FIGS. 9 to 12.

A buffer car 52 and a moving container 54 are displaced on the buffer area D to temporarily store the computer bodies after test. The buffer car 52 has a structure of an upper layer, a middle layer, and a lower layer as same way of the aging car, and the buffer car 52 and the moving container 54 are interlocked each other, and automatically move the computer body 39. A package area E is located between an output area F and the buffer and carrier area D. A package 60 having a vacuum absorber 58 is installed in the package area E. A conveyor section 62 is displaced on the output area F. In addition, a fifth operator P5 is displaced on the package 60 for the package.

Figure 10:
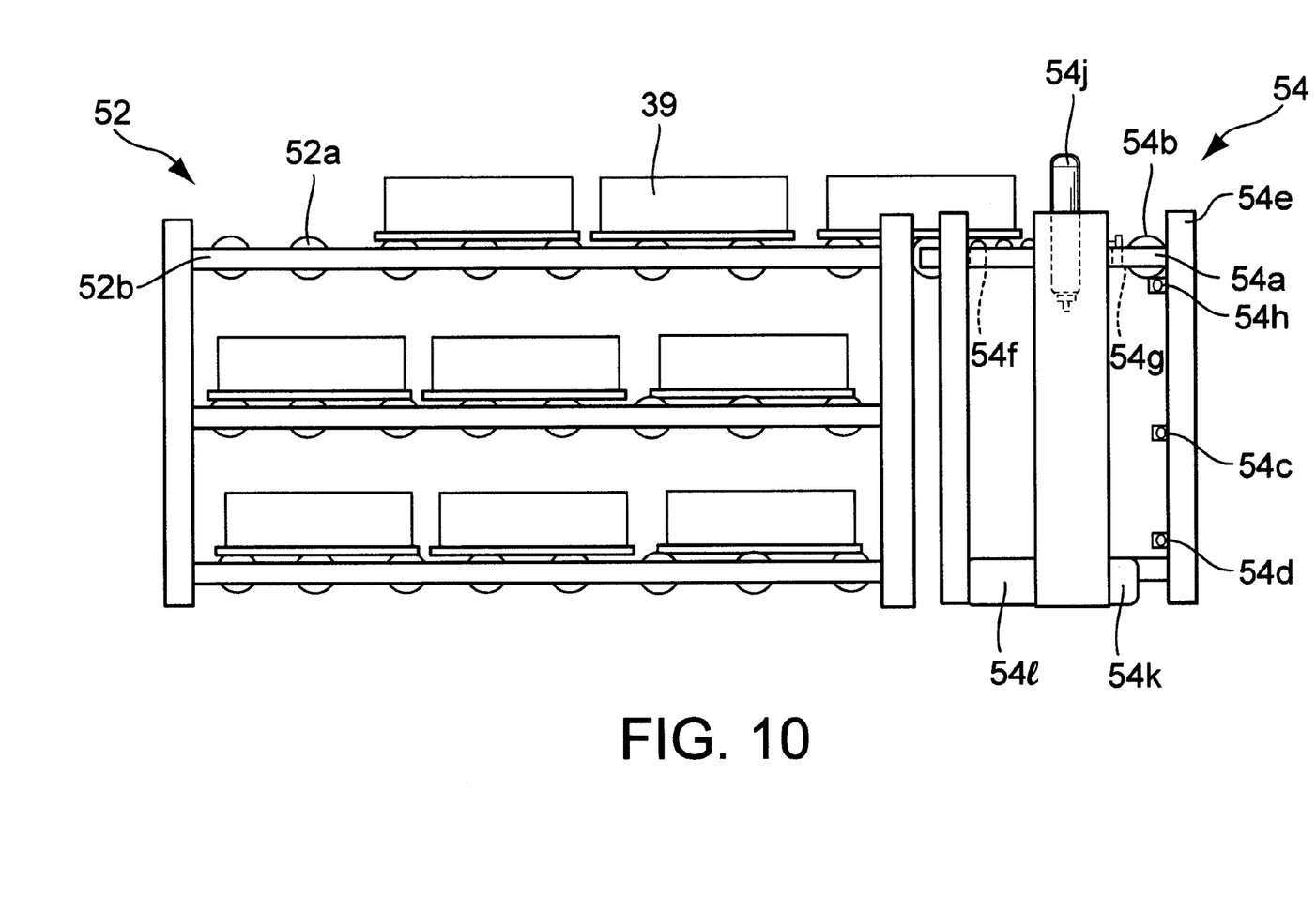
FIG. 10 is a side view to show the buffer and carrier area.

The detailed construction and the operation of the buffer car 52 and the moving container 54 will be described. The buffer car 52 has a construction of an upper layer, a middle layer, and a lower layer by the frame 52*b* as the same manner as the aging cars. A plurality of driving rollers 52*a*, which are parallel distanced on each layer, are fixed the frame 52*b*. The driving roller 52*a* is designed to be one-direction rotated by a driving force from a motor to form a buffer car driving mechanism. Accordingly, if the driving roller 52*a* is rotated into one direction, the computer bodies 39 loaded in the same layer are all transferred into one direction.

Figure 11:
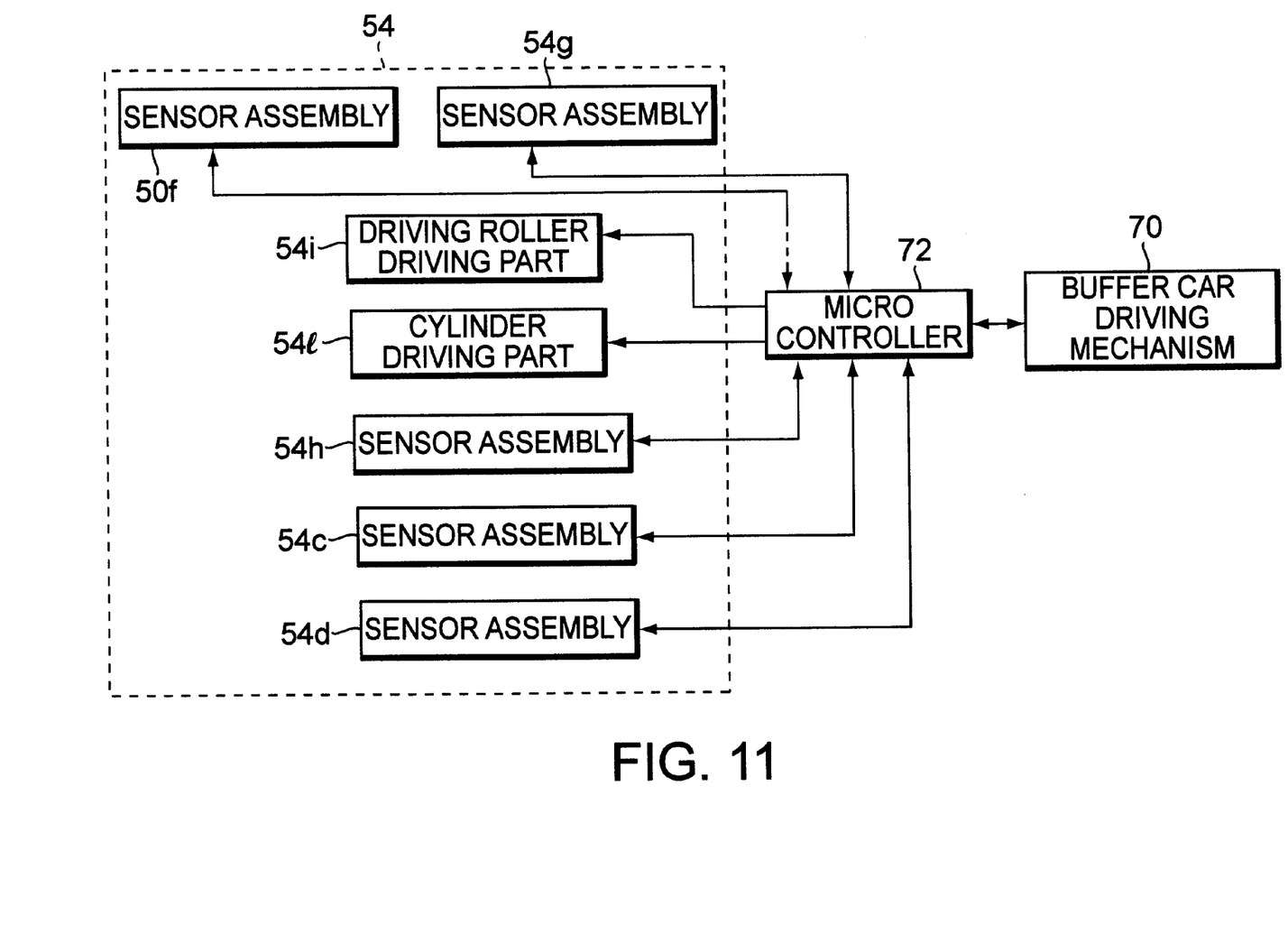
FIG. 11 is a block diagram to show the buffer and carrier area.

The above buffer car driving mechanism 70 is controlled by a micro controller 72, and the micro controller 72 converts its control state according to the presence of the computer body 39 to be packaged on the upper side of the transfer frame 54*a* of the moving container 54. The moving container 54 has the structure of a upper layer, a middle layer, and a lower layer as the same manner as the moving container 38 in the aging and test area C.

A sensor assembly 54*h*, 54*c*, and 54*d* is installed on the frame 54*e* to sense the moving of the transfer frame 54*a*, and a sensor assembly 54*f*, 54*g* is installed on the transfer frame 54*a* to sense the presence of the input of the computer body 39 and sense the presence of the computer body 39 on its opposite side respectively. A driving roller 54*b* is installed on the transfer frame 54*a* to be traversed to the input direction of the computer body 39, and the driving roller 54*b* of the transfer frame 54a is operated by a driving roller driving part 54i including a motor. The transfer frame 54a of the moving container 54 is coupled with a second cylinder 54j to move up/down a short interval as the same manner as the transfer frame 38b of the moving container 38 in the aging and test area C, and the second cylinder 54j is provided on the first cylinder 54k to move up/down a short interval. In addition, the first cylinder 54k is fixed on the upper side of the frame 54e of the moving container 54. Under the moving container 54, a cylinder driving part 54l is installed to supply the driving force for driving the first and the second cylinders 54k, 54j.

Each of the sensor assembly 54h, 54c, 54d, 54f, and 54g of the moving container 54, the driving roller driving part 54i, and the cylinder driving part 54l are interfaced with the micro controller 72. The micro controller 72 is interfaced with the buffer car driving mechanism 70. Accordingly, the micro controller 72 controls the moving container 54 and the buffer car 52 to be interlocked each other.

Figure 12:
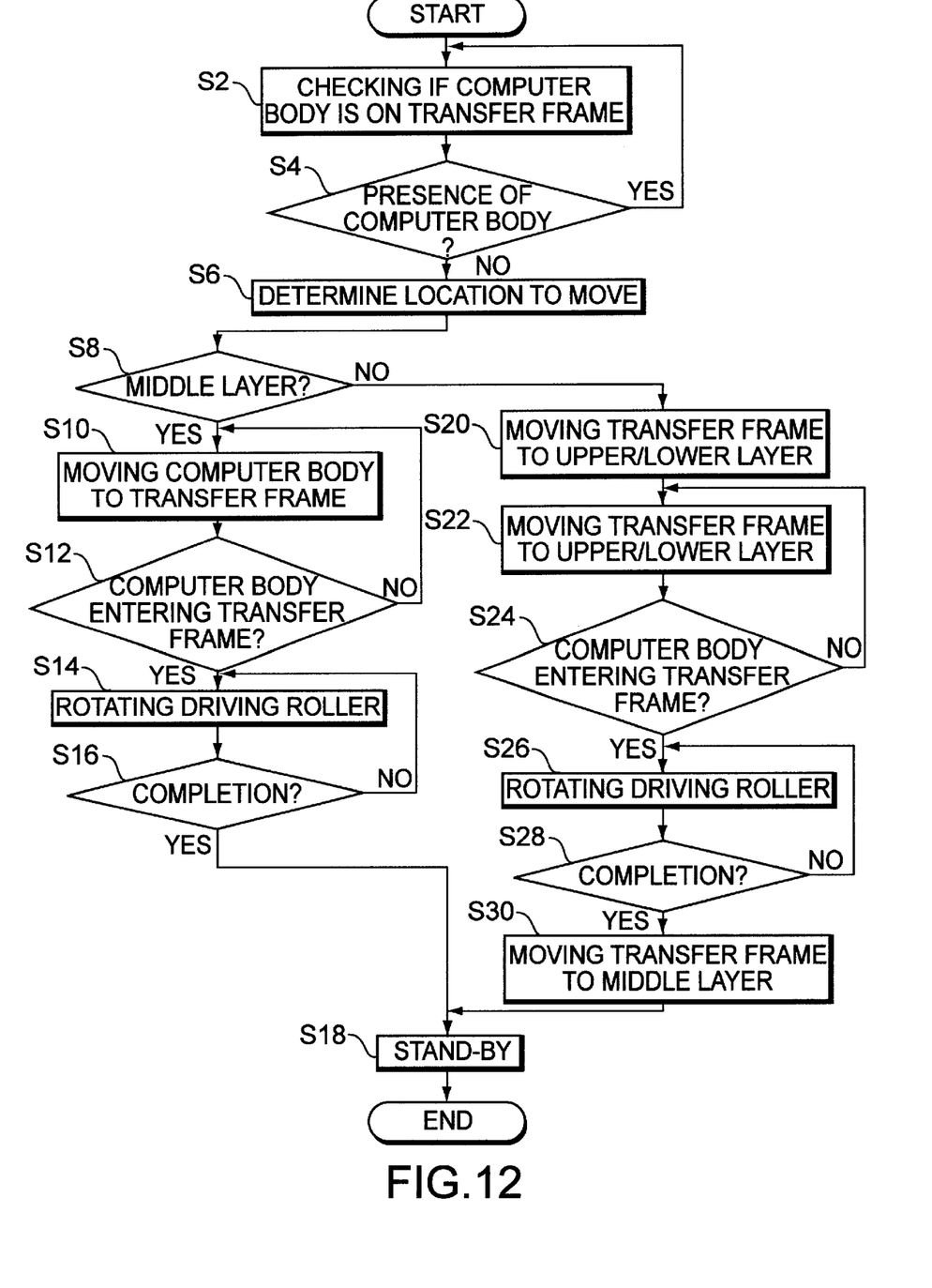
FIG. 12 is a flow chart to show the transfer of a computer body in the buffer and carrier area.

Referring to FIGS. 11 and 12, the transfer of the computer body 39 from the buffer and carrier area B to the package area E will be described.

The computer body 39, which is test-completed in the aging and test area C, is loaded on each layer of the buffer car 52 by the push from the fourth operator P4. At this time, the transfer frame 54a of the moving container 54 is always located in the middle layer with one computer body 39 for package loaded thereon.

The sensor assembly 54g installed on the transfer frame 54a of the moving container 54 senses the presence of the computer body 39, and if the computer body 39 is moved to the package 60 for package, any one among the computer bodies 39 loaded on the buffer car 52 is moved according to an order. That is, the micro controller 72 always checks whether a computer body 39 is present on the upper side of the transfer frame 54a S2. When the computer body 39 is moved to the package 60 for package, a sensing signal is input from the sensor assembly 54g. If any presence of the computer body 39 on the upper side of the transfer frame 54a of the moving container 54 is not detected S4, the micro controller 72 determines the location to move the transfer frame 54a according to a predetermined manner.

If the order to load the computer body 39 is determined from a upper layer to a lower layer, the micro controller 72 moves the computer body 39 on the upper layer to the transfer frame 54a. That is, the micro controller 72 determines, first, the transfer location as a upper layer, and if the upper layer is filled with the amount it accommodates, the transfer location is determined as a middle layer. After some determined amount of the computer bodies 39 are transferred in the middle layer, a lower layer is, then, determined as a next transfer location. Then, the transfer of the computer bodies is repeated from the upper layer.

According to the above sequence, the micro controller 72 determines whether the location to be transferred is a middle layer, and if a middle layer S8, the micro controller 72 starts to move the computer body 39 in the corresponding layer while maintaining the present location. With the movement start of the computer body 39, the buffer car driving mechanism 70 is controlled by the micro controller 72, and corresponding thereto, the driving roller 52a of the middle layer of the buffer car 52 starts its driving. Then, computer bodies 39 loaded on the middle layer are totally moved to the moving container 54 into one direction, and the last computer body 39 is input to the transfer frame 54a of the moving container 54 S10.

It is determined whether the computer body 39 is completely input to the transfer frame 54a S12, which is dependant on the switching state of the sensor assembly 54g. If the micro controller 72 determines whether the computer body 39 is input to the transfer frame 54a, the driving roller driving part 54i is controlled so as to rotate the driving roller 54b into one direction S14.

When the driving roller 54b is rotated into one direction, the computer body 39 is continuously moved into the transfer frame 54a, and when the computer body 39 is moved to the location contacting with the sensor assembly 54g, the micro controller 72 determines that the transfer is completed. (S16) In addition, the micro controller 72 controls the driving roller driving part 54i, and stops the driving of the driving roller 54b according to the changes of the switching state of the sensor assembly 54g. Then, maintaining the stand-by state S18, it is returned to an initial state.

Meanwhile, if the micro controller 72 determines the transfer location as a upper layer or a lower layer, the cylinder driving part. 54l is controlled to drive the first and the second cylinder 54k, 54j, and while the first and the second cylinder 54k, 54j move according to the control of the cylinder driving part 54l, the transfer frame 54a moves up/down to the corresponding layer as the same manner as the moving container 54 S20.

If the transfer frame 54a is located on either the upper layer or the lower layer by moving up/down, the micro controller 72 moves the computer body 39 to the transfer frame 54a as the above manner S22, S24, S26, and S28, and if the transfer of the computer body is completed to the upper side of the transfer frame, the first and the second cylinders 54k, 54j are back-driven, and the transfer frame 54a is moved to the middle layer.S30 Then, maintaining the stand-by state S18, it is returned to an initial state. Therefore, the computer body 39 is transferred from the buffer car 52 to the moving container 54 one-by-one.

The computer body 39 loaded on the transfer frame 54a of the moving container 54 is moved to a table 60a of the package 60 by a fifth operator P5, and is packaged. In the package 60, a pair of vacuum absorbers 58 are provided over the table 60a having a certain height, and the vacuum absorbers 56, 58 are installed a certain height apart from the table 60a by the frame 60b connected with the side of the table 60a. The vacuum absorbers 56, 58 are supported by the frame 60b to move up/down. The vacuum absorbers 56, 58 are located under the table 60a, and are driven by a vacuum driving part 60d, its operation state being varied by a paddle 60c which the fifth operator P5 controls by his feet. The vacuum driving part 60d is constructed for the up/down movement of the vacuum absorber 56, 58 and the supply of the vacuum.

After testing the outer shape of the computer body 39, the vacuum absorbers 56, 58 are driven by the fifth operator P5, and an empty package box is placed under the computer body 39, and the computer body is packaged with materials such as buffer. Then, the fifth operator P5 redrives the vacuum absorbers 56, 58 and moves them down, and puts the buffer-packaged computer body 39 into the package box and seals the open with tapes.

Through the above sequence, the packaged box 64 having the computer body therein is loaded on a transfer section 62 by the fifth operator P5, and moved to a certain location. At the conveyor end, the computer bodies are loaded onto an output pallet 66 and moved to a certain unloading location. The transportation to the unloading location using the pallet 66 and the package can be performed assistantly by either the first P1 or the third operator P3 of the above operators. Therefore, since the first operator P1, the second operator P2, and the fifth operator P5 share the work space together, sufficient work space can be allowed with minimized area.

Throughout the above processes, the required number of the operators for one cell is approximately five or six. Even on the limited space in a factory, various itemized production can be possible by forming a cell line having a double-bended structure as the embodiment of the present invention thereby increasing the competitiveness in the rapidly-changing business market environment, and allowing easy production of small amount of various items.

In addition, the install expenses of the units on each unit cell is good because of the cell line structure for small amount of production. Therefore, the economic burden for the alteration or modification of the structure of each unit cell or the replacement of the apparatuses therein can be released. Since an aging and test unit for the respective item is installed inside each cell line, the environment for quality assurance can be provided, and so, the reliability for the output products can be optimized. Also, since a number of operators in the cell line perform the operation standing, they can quickly cope with the operation states to require rapid actions, and the balance of the operation and the productivity can be optimized since the operators share their work space. Therefore, the optimized system for small amount of production for various items can be established by making cell units, each having a certain unit space area of the computer manufacturing factory, and the installment investment and the efficiency of the personnel placement can be improved, and the reliability of the products is also improved.

In the accompanying drawings and specification, there has been disclosed a typical preferred embodiment of the invention, and although specific terms are employed, they arc used in a generic and descriptive sense only and not for purposes of limitation, the scope of the invention being set forth in the following claims. It will be apparent to those skilled in the art that various modifications and variations of the present invention can be made without departing from the spirit or scope of the invention.

What is claimed is:

1. A manufacturing system, comprising:
   an assembly unit having a first plurality of parts to be assembled, including an assembling work station for assembling said parts into a product and a first carrier for moving said product in a first direction without changing said first direction during assembling said product, said assembly unit being substantially straight without discontinuity;
   a test unit located adjacent to said assembly unit, having a second carrier for moving said product in a second direction perpendicular to said first direction after receiving said product from said assembly unit during testing said product and moving said product in a third direction opposite to said first direction and perpendicular to said second direction after testing said product;
   a packing unit located adjacent to said test unit, having a packing work station for packing said product, having a third carrier for receiving and moving said product at said third direction after packing said product with a package;
   a common work place defining an opening and three sides surrounded by said assembly unit, said test unit, and said packing unit, said opening and said test unit disposed opposite to each other while said assembly unit and said packing unit are disposed opposite to each other; and
   a main frame including a supplying frame for supplying said first plurality of parts contained in a box downwardly toward said assembling work station, said supply frame disposed adjacent to said assembly unit and opposite to said common work place, said supply frame obliquely mounted on said main frame toward said assembling work station of said assembly unit.

2. The system of claim 1, with said assembly unit including a preassembler having a second plurality of parts to be assembled, said preassembler including a second assembling work station for assembling said second plurality of parts into a module, and said preassembler including a preassembly carrier for moving said module at said first direction to be assembled into said product.

3. The system of claim 2, with said preassembler including a preassembly receipt frame for supplying said second plurality of parts to said second assembling work station, said preassembly receipt frame disposed adjacent to said second assembly work station and opposite to said common work place.

4. The system of claim 2, with said preassembly receipt frame including a first frame obliquely mounted in said preassembly receipt frame to supply said second plurality of parts contained in a second box toward said second assembling work station.

5. The system of claim 4, wherein said second box containing said parts moves downwardly toward said second assembling work station.

6. The system of claim 4, with said preassembly receipt frame including a second frame obliquely mounted in said preassembly receipt frame to discharge said box downwardly remote from said second assembling work station after said parts are removed from said box.

7. The system of claim 2, further comprised of said preassembler including a delivery car for supplying a main chassis to said assembly unit, said main chassis assembled into said product.

8. The system of claim 7, with said assembly unit including a main assembler, said main assembler including a third assembling work station for receiving a module, said chassis, said first plurality of parts and for assembling said module, said chassis, and said first plurality of parts into said product, said main assembler having a main carrier for moving said product at said first direction.

9. The system of claim 8, with said main frame comprising a discharging frame disposed adjacent to said assembly unit and opposite to said common work place, said discharging frame obliquely mounted on said main frame in order to discharge said box downwardly remote from said third work station after said parts contained in said box are supplied to said work station.

10. The system of claim 8, wherein said preassembler and said main assembler are disposed adjacent to each other to move said product at said first direction without changing said first direction during assembling said product.

11. The system of claim 8, wherein said second assembling work station and said third assembling work station are disposed adjacent to each other to move said product in said first direction without changing said first direction during assembling said product.

12. The system of claim 1, further comprised of a moving container located between and adjacent to both said assembly unit and said test unit, receiving said product from said assembly unit and transferring said product to said test unit at said first direction.

13. The system of claim 12, further comprised of said moving container including a transfer frame and a driver for locating said transfer frame on one layer of either a first layer having same height of said work station or a second layer having different height of said work station.

14. The system of claim 12, further comprised of said second carrier having the same number of layers as said moving container.

15. The system of claim 12, further comprised of said moving container fixed between and adjacent to both said assembly unit and said test unit.

16. The system of claim 1, further comprised of said second carrier having a guide for moving said second carrier at said second direction.

17. The system of claim 1, further comprised of said test unit including a test station for testing said product.

18. The system of claim 17, further comprised of said test station having a display unit and a connector for connecting said product located said second carrier to said display.

19. The system of claim 18, further comprised of said test station having switch for connecting a plurality of said products located on one of a plurality of layers of said second carriers to said display unit in order to display information about test result.

20. The system of claim 1, further comprised of said packing unit having a buffer car including a plurality of layers having same number of layers of said second carrier.

21. The system of claim 20, further comprised of said packing unit including a packing container for moving said product located on one layer of said buffer car to a packing station to pack said product with a package.

22. The system of claim 21, further comprised of said packing unit including a conveyer for moving said product contained in said package at said third direction.

23. The system of claim 1, wherein said assembling work station is substantially straight without discontinuity and is disposed to move said product without changing said first direction during assembling said product.

24. A manufacturing system comprising:
   an assembly unit receiving a plurality of parts, having an assembly work station for assembling said parts into a product, having a first carrier for moving said product in a first direction, said assembly work station being substantially straight without discontinuity and disposed to move said product without changing said first direction during assembling said product;
   a test unit located adjacent to said assembly unit, having a test station for testing said product, having a second carrier for receiving said product transferred from said first carrier of said assembly unit and for moving said product in a second direction having an angle with said first direction; and
   a packing unit located adjacent to said test unit and opposite to said assembly unit, having a packing work station for packing said product, having a third carrier for receiving said product from said test unit and for moving said product in a third direction opposite to said first direction.

25. The manufacturing system of claim 24, further comprising a common work place surrounded by said assembly unit, said test unit, and said packing unit, having an open end disposed opposite to said test unit.

26. The manufacturing system of claim 24, further comprising a common work place providing a common space for both said assembling work station and said packing work station.

27. The manufacturing system of claim 24, further comprising a common work place disposed between said assembling work station and said packing work station.

28. The manufacturing system of claim 27, further comprising a first frame disposed in said assembly unit, adjacent to said assembly work station, and opposite to said common work place, supplying said parts to said assembly work station, said first frame obliquely mounted in said assembly unit toward said assembling work station of said assembly unit.

29. The manufacturing system of claim 28, wherein said parts is contained in a box, said box moving downwardly toward to said assembly work station.

30. The manufacturing system of claim 29, further comprising a second frame for discharging said box downwardly from said assembly work station after said parts are unloaded from said box, disposed below said first frame, adjacent to said assembly work station, and opposite to said common work place, said second frame obliquely mounted in said assembly unit.

31. The manufacturing system of claim 24, further comprising a delivery car located adjacent to said assembly unit, supplying a chassis and a module to be assembled with said parts into said product.

32. The manufacturing system of claim 24, wherein said assembly unit is disposed to receive said parts, a chassis, and a module and to assemble said parts, said chassis, and said module into said product.

33. The manufacturing system of claim 24, further comprising a moving container disposed between and adjacent to both said assembly unit and said test unit, receiving said product from said assembly unit and transferring said product to said test unit in said first direction.

34. The manufacturing system of claim 33, said moving container including a transfer frame and a driver for locating said transfer frame on one layer of either a first layer having the same height as said assembly work station or a second layer having different height from said assembly work station.

35. The manufacturing system of claim 34, said second carrier of said test unit having the same number of layer as said moving container.

36. The manufacturing system of claim 34, wherein said angle between said first direction and said second direction is about 90 degree.

37. The manufacturing system of claim 24, wherein said first direction and said third direction are perpendicular to said second direction.

* * * * *